United States Patent [19]
Pierce

[11] 4,192,144
[45] Mar. 11, 1980

[54] DIRECT CONTACT HEAT EXCHANGER WITH PHASE CHANGE OF WORKING FLUID

[75] Inventor: Bill L. Pierce, Whitehall, Pa.

[73] Assignee: Westinghouse Electric Corp., Pittsburgh, Pa.

[21] Appl. No.: 930,767

[22] Filed: Aug. 3, 1978

Related U.S. Application Data

[63] Continuation of Ser. No. 761,048, Jan. 21, 1977, abandoned.

[51] Int. Cl.² .................................................. F03G 7/02
[52] U.S. Cl. ......................................... 60/641; 60/659; 165/104 S; 128/28; 126/400
[58] Field of Search .................. 165/104 S, DIG. 4; 60/659, 641; 122/28; 126/271, 400, 344

[56] References Cited
U.S. PATENT DOCUMENTS

2,933,885  4/1960  Benedek et al. ...................... 60/659
3,977,197  8/1976  Brantley, Jr. ........................ 60/659

*Primary Examiner*—Albert W. Davis, Jr.
*Attorney, Agent, or Firm*—Edward L. Levine; Z. L. Dermer

[57] ABSTRACT

A direct contact thermal storage heat exchanger which utilizes the liquid-vapor phase change of a working fluid within the heat exchanger, and energy generation systems incorporating the heat exchanger. The heat exchanger is particularly useful in combination with a solar energy receiver. The heat exchanger includes an insulated pressure vessel packed with pebbles or spheres. Working fluid in the vapor phase from a solar heat source enters the unit and condenses, transferring thermal energy to the pebbles. The liquid level of working fluid about the pebbles is decreased during this mode of operation. When it is desirable to release this stored energy the liquid level is increased, and the energy is transferred to the working fluid which forms a vapor, and can be used to drive a turbine or other prime movers.

6 Claims, 9 Drawing Figures

DIRECT CONTACT HEAT EXCHANGER WITH PHASE CHANGE OF WORKING FLUID

This is a continuation of application Ser. No. 761,048 filed Jan. 21, 1977, now abandoned.

BACKGROUND OF THE INVENTION

1. Field of the Invention

This invention relates to direct contact (pebble bed) heat exchangers particularly useful for storage of thermal energy from an intermittent heat source such as the sun.

2. Description of the Prior Art

The discontinuous character of certain forms of energy, such as solar radiation, has long been recognized as one of the challenges to be surmounted in putting such energy to practical use. Storage of energy in thermal form has been recognized as one approach to this challenge which, however, has proved difficult from an efficiency and cost standpoint. Additional challenges have arisen in integrating storage apparatus into a complete energy utilization system such as those producing electrical energy through turbine generator apparatus. Such systems typically require a relatively constant utilization fluid pressure, such as steam pressure at a turbine inlet, which is difficult to obtain from a discontinuous heat source.

In view of the current and projected need for use of discontinuous or significantly varying energy sources, it is therefore desirable to provide efficient and economic thermal storage apparatus and utilization systems incorporating such apparatus.

SUMMARY OF THE INVENTION

This invention provides a direct contact storage heat exchanger, typically referred to as a "pebble bed" type, which responds to these energy challenges and can easily be incorporated in electrical or other energy generation systems. It particularly utilizes the advantageous thermal characteristics resulting from a liquid-vapor phase change in a working fluid within the storage heat exchanger, and can similarly utilize the liquid-solid phase change of a medium encased in sealed pebbles or spheres. The system can be operated with relative ease through controlled variation of the liquid level and corresponding pressure of the working fluid within the heat exchanger and about the pebbles.

In one embodiment the heat exchanger includes an insulated pressure vessel and a plurality of pebbles packed within the vessel. The pebbles can be solid, utilizing sensible heat storage, or can include sealed shells internally containing a material such as inorganic salts or salt eutectic mixtures which additionally utilize the latent heat of fusion as the internal material undergoes a solid-liquid phase change.

The upper portion of the pressure vessel includes a port through which a working fluid, such as water or organic fluids, passes in or out in the vapor phase. Preferably, superheated vapor enters the heat exchanger from a heat source, such as a solar collector, and is subsequently discharged from the heat exchanger to energy generation apparatus, such as a turbine. The lower portion of the heat exchanger vessel includes a port through which the working fluid passes in or out in the liquid phase. This liquid can pass to and from a liquid storage tank, or be recirculated to other components in the energy generation system.

The heat exchanger system is controlled primarily by varying the liquid level within the heat exchanger. During periods when the energy supply (superheated vapor) is greater than the energy (turbine) demand, a portion of the vapor is directed into the heat exchanger through the top port. The vapor thereby transfers heat energy to the pebbles as it is serially cooled to the saturation temperature, condensed, and subcooled. Initially a selected volume within the heat exchanger about the pebbles is filled with liquid below the saturation temperature. As energy is added to the heat exchanger by the vapor, the liquid level is lowered exposing more pebbles to absorb the thermal energy of the fluid's superheat and latent heat. Sensible heat in the condensed liquid is absorbed by the pebbles below the liquid level within the heat exchanger. The discharged liquid can be stored in the storage tank.

During periods when the demand for energy exceeds the solar supply, the liquid level in the heat exchanger is increased by adding liquid from the storage tank or another feedwater source. The liquid within the heat exchanger close to the liquid-vapor interface is therefore placed in contact with pebbles at temperatures greater than the saturation temperature at the heat exchanger operating pressure. This fluid thus vaporizes and is superheated as it continues to pass upwardly through the upper portion of the pebble bed.

Thus, the direct contact storage heat exchanger can also act as a pressurizer and load leveler for an energy utilization system, as well as providing energy to generating apparatus after the energy source has been completely shut down. It will be apparent that the primary mechanisms for energy transfer within the heat exchanger are condensation and nucleate boiling, both of which have relatively high heat transfer coefficients. Further, the direct contact or pebble bed approach provides a large surface area for heat transfer per unit volume. These characteristics therefore provide high heat transfer rates with a relatively small temperature difference between the working fluid and the pebble outer surface, and good storage system efficiency.

BRIEF DESCRIPTION OF THE DRAWINGS

The advantages of this invention will become more apparent from the following description and accompanying drawings, in which.

DESCRIPTION OF THE PREFERRED EMBODIMENTS

Figure 1:
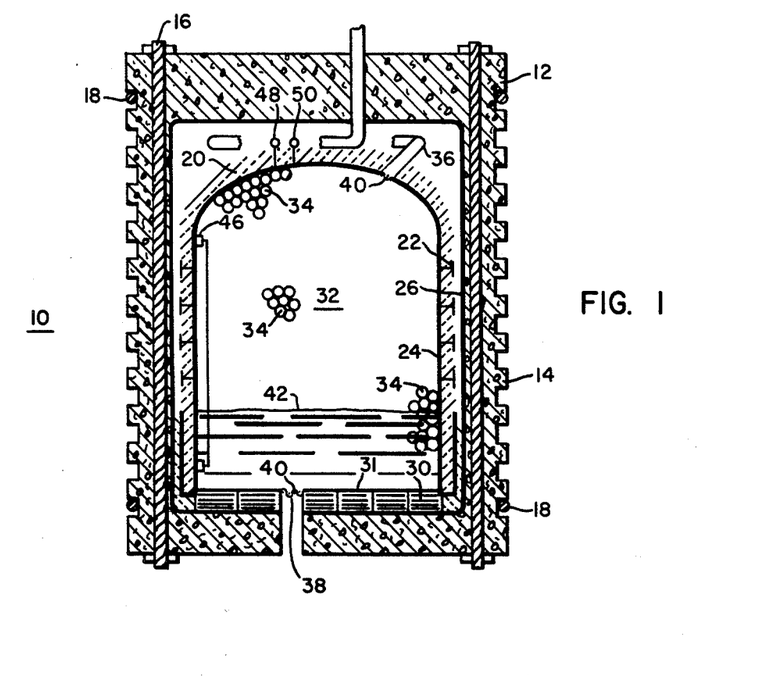
FIG. 1 is a section view, in elevation, of a direct contact thermal storage heat exchanger in accordance with this invention.

Referring now to FIG. 1, there is shown a direct contact, or pebble bed, storage heat exchanger 10 which utilizes a liquid-vapor phase change of a working fluid within the heat exchanger. The heat exchanger includes a pressure vessel 12 which can be of various constructions, such as steel or prestressed concrete, although a prestressed cast iron type is shown. It includes a plurality of cast iron segments 14 bound by axial 16 and circumferential 18 prestressed cables. To increase the efficiency and thermal storage capacity of the heat exchanger 10 it is provided with insulating means such as the insulation 20 supported by insulation plates 22 bounded by inner 24 and outer 26 metallic liners. In order to structurally support the contents of the heat exchanger 10, the bottom insulation can include ceramic bricks (not shown) or layered steel plates 30. A support plate 31 can also be utilized above the bottom insulating bricks or plates.

Within the above-described structure is a bed 32 comprised of a plurality of pebbles 34, the composition of which is discussed further below. The shape and size of the pebbles 34 can vary although a generally spherical configuration is preferred in order to provide a large surface area for heat transfer and sufficient "void" space among the pebbles for passage of a working fluid. The size and packing fraction of the pebbles can be varied in accordance with desired thermal characteristics. The pebbles 34 should however be packed sufficiently tight to alleviate any significant movement within the bed 32 as a result of fluid flow or expansions and contractions of the pebbles 34 and surrounding inner liner 24 and insulation.

The heat exchanger 10 is also provided with one or more upper ports 36 through which working fluid in a vapor phase passes into or out of the pebble bed 32. It also includes one or more lower ports 38 through which working fluid in a liquid phase flows into or out of the bed 32. The ports 36, 38 are provided with means for retaining the pebbles 34 within the heat exchanger 10 such as mesh 40.

It is to be understood that throughout this specification and the appended claims terms such as "a liquid-vapor phase change" and "solid-liquid phase change" refer respectively to a liquid-to-vapor and vapor-to-liquid phase change, and a solid-to-liquid and liquid-to-solid phase change.

The thermal storage system is controlled primarily be varying the liquid level 42 of the working fluid within the heat exchanger. When it is desired to input and store thermal energy in the heat exchanger 10, superheated vapor from a heat source is passed into the unit 10 through the upper port 36. As the superheated vapor contacts the pebbles 34 it is cooled to saturation temperature, condensed, and subcooled, transferring thermal energy to the pebbles 34. Initially a portion of the volume within the heat exchanger 10 about the pebbles 34 is filled with liquid at a temperature below the saturation temperature of the working fluid at the operating pressure within the heat exchanger 10. As thermal energy is added to the upper pebbles 34 by the vapor, the liquid level 42 is lowered exposing additional lower pebbles 34 to absorb the energy of the working fluid's superheat and latent heat. Sensible heat in the condensed liquid is absorbed by the pebbles below the liquid level within the bed. The liquid discharged through lower port 38 can be stored in a liquid storage tank 44 (FIG. 2) or otherwise returned to the generation system. The storage tank 44 can be pressurized, preferably with a gas inert to the working fluid, or rely upon pumping capacity for fluid transfer. To increase efficiency, the tank 44, connecting conduits, and other system components are preferably insulated.

The liquid level 42 can be monitored and controlled by level controllers 46. Additional instrumentation, such as temperature 48 and pressure 50 transducers can also be utilized. Pressure control is particularly critical in generation systems where the working fluid vapor flows directly to a turbine 52 which requires a relatively constant steam pressure at an inlet control valve 54. The energy in the vapor can be utilized to drive many other types of prime movers, such as gas turbines and diesel engines, or can be used directly as process heat.

When it is desired to discharge thermal energy from the heat exchanger 10 in the form of a vapor, typically superheated, the liquid level 42 in the pebble bed 32 is increased or raised by adding liquid from the storage tank or another feedwater source. As this occurs, the liquid within the bed 32 close to the liquid-vapor interface is placed in direct contact with pebbles 34 at temperatures greater than the saturation temperature of the working fluid at the operating pressure. The fluid therefore vaporizes and is superheated as it continues to pass upwardly through the bed 32. It is then discharged through upper port 36.

In order to effectively take advantage of the thermal storage capacity of the heat exchanger 10 while avoiding the potential for completely filling with either vapor or liquid, it is preferred that 80 to 90 percent of the bed height be utilized for liquid level variation.

Figure 2:
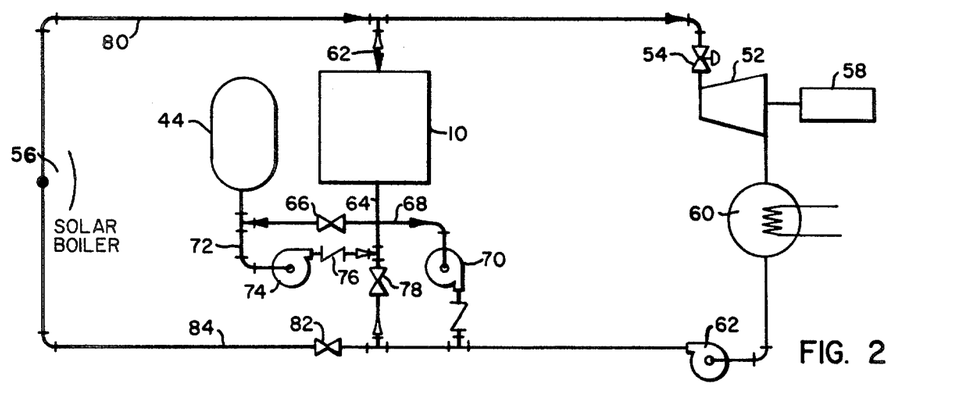
FIG. 2 is a flow schematic of an energy generation system incorporating a storage heat exchanger consistent with this invention.

The working fluid can comprise water, particularly in generation systems which also utilize the working fluid to drive turbine apparatus, such as that shown in FIG. 2. In systems utilizing a turbine recirculation system separated from the heat source system (FIG. 5), organic fluids and compounds can advantageously be used in the storage loop. Some organic fluids have working pressures as low as 25 psia. Lower working pressures can significantly reduce the design pressure and cost of the pressure vessel 12. Total heat source and generation system performance and cost, and the effect of lower pressure, must however be considered when defining parameters for a complete system. An exemplary organic working fluid is monoisopropylbiphenyl (MIPB). MIPB has a boiling point of 563° F. at standard temperature and pressure conditions, so that a loop circulating MIPB between a heat source 56 or solar receiver and a storage heat exchanger 10 could operate at close to atmospheric pressure.

Use of pebbles 34 comprised of specific materials in the storage heat exchanger 10 can prove highly advantageous. The large surface area per unit volume and the tortuous path the working fluid must take through the bed 32 ensures a rapid heat exchange.

The conduction of heat through the pebble bed 32 itself, with approximately one-third to one-half of its volume occupied by vapor or liquid between the pebbles 34, is low because the pebbles touch each other only in limited areas at the point of contact, particularly if spherical pebbles are used, and the pebbles reduce the thermal convection of the enclosed vapor or liquid. The loss of heat through the heat exchanger 10 walls is thus much reduced and is further reduced by the insulation. The composition of the pebbles can include solid spheres or other geometric shapes that utilize sensible heat storage, or can include a material that is encapsulated within a pebble and undergoes a solid-liquid phase change and therefore utilizes both latent heat of fusion and sensible heat storage. Although no particular material composition has been identified as ideally suited for use in the pebbles of the storage heat exchanger 10, Table I is a compilation of candidate materials having potential applicability as heat of fusion storage materials for encapsulated pebbles. They include inorganic salts, salt eutectics, and some pure elements. Although the approximate heats of fusion are given per unit weight in Table I, the ranking is roughly the same on a volume basis for the inorganic salts since nearly all such materials have densities in the 2.0–2.5 gm/cm$^3$ range. In the case of salt eutectics it is invariably found that the heat of fusion of a given eutectic is lower than the highest heat of fusion among its pure constituents, and often lower than the lowest. Thus the values given in the eutectic cases are upper bounds.

TABLE I
CANDIDATE MATERIALS FOR HEAT-OF-FUSION THERMAL ENERGY STORAGE

| Material | Melting Point °C. | Heat of Fusion* (cal/gm) |
|---|---|---|
| Inorganic Salts: | | |
| $BiCl_3$ | 232 | 18.0 |
| $SnCl_2$ | 247 | 22.8 |
| $LiNO_3$ | 254 | 87.8 |
| $ZnCl_2$ | 283 | 40.6 |
| $NaNO_3$ | 310 | 44.2 |
| $K_2Mo_2O_7$ | 484 | — |
| CuBr | 488 | 16.0 |
| $PbCl_2$ | 498 | 20.3 |
| $PbO \cdot B_2O_3$ | 500 | — |
| Inorganic Salt Eutectics:\*\* | | |
| 50 NaCl - 50 $BeCl_2$ | 215 | (123.5–30.0)\*\*\* |
| 73 NaOH - 27 LiOH | 218 | (50.0–208.8) |
| 22 NaBr - 78 NaOH | 260 | (59.7–50.0) |
| 40.5 NaCl - 59.5 $ZnCl_2$ | 262 | (123.5–40.6) |
| 55 LiBr - 45 LiOH | 275 | (48.6–208.8) |
| 90 NaOH - 10 $Na_2CO_3$ | 286 | (50.0–66.0) |
| 37 LiCl - 63 LiOH | 290 | (112.3–208.8) |
| 44 LiCl - 56 $BeCl_2$ | 300 | (112.3–30.0) |
| 75 LiBr - 25 $BaBr_2$ | 483 | (48.6–21.9) |
| 71 LiCl - 29 LiF | 485 | (112.3–249.4) |
| 38 $K_2CO_3$ - 62 $Li_2CO_3$ | 488 | (56.4–144.8) |
| 52 LiF - 48 KF | 492 | (249.4–116.2) |
| 62 LiCl - 38 $CaCl_2$ | 496 | (112.3–61.1) |
| 57.3 $K_2CO_3$ - 42.7 $Li_2CO_3$ | 498 | (56.4–144.8) |
| 48 NaCl - 52 $CaCl_2$ | 500 | (123.5–61.1) |
| 61 LiCl - 39 $Li_2CO_3$ | 507 | (112.3–144.8) |
| 78 $Li_2SO_4$ - 8.5 $K_2SO_4$ - 13.5 $Na_2SO_4$ | 512 | (27.6–52.0–41.0) |
| 80 $Li_2SO_4$ - 20 $K_2SO_4$ | 535 | (57.6–52.0) |
| Pure Elements: | | |
| Se | 217 | 15.4 |
| Sn | 232 | 14.4 |
| Bi | 271 | 12.0 |
| Tl | 303 | 5.0 |

*Where widely conflicting reference values are available, the larger quoted value is given.
\*\*Molar compositions given.
\*\*\*Heats of fusion of parent single salts.

All of the listed salts react with and/or dissolve in water to some extent, with resultant complications such as large increases in chemical reactivity. It is thus mandatory that if a salt is used it will be reliably isolated from contact with moisture or water vapor, or other working fluids. In considering chemical interactions between salts and pebble materials, graphite is preferred as a pebble outer shell because it is likely inert to all of the salt candidates. Other candidate non-metallic materials include fused silica (quartz) and high purity alumina. For metallic pebbles, chemical compatibility is more complex. For most hydroxides, low carbon nickel and certain nickelbase alloys such as Monel 400 (the International Nickel Company, Inc.) are compatible. Pure nickel is also compatible with certain fluoride-hydroxide eutectics. And, Hastelloy N (Union Carbide Company) has been successfully used in contact with a number of fluoride mixtures in the Molten-Salt Reactor Program.

Some carbonates are so reactive that no suitably compatible metals or alloys, excluding the expensive precious metals and such refractory metals as molybdenum and tungsten have presently been identified. Most salts exhibit significant volume changes upon fusion/solidification, and in many cases the values are extremely large, making them less desirable as heat of fusion candidates in the taught application. For example, among the salts listed in Table I, $LiNO_3$ expands 21.4 percent upon melting, $NaNO_3$ expands 10.7 percent and $ZnCl_2$ expands 11.6 percent. These large volume changes must be carefully accounted for in the pebble 34 design in order to avoid the development of high stresses in and mechanical damage to the pebble outer shell during melting. Also, large shrinkage during solidification may greatly reduce the salt/element shell contact area, thus imposing a heat transfer penalty during subsequent remelting.

Therefore, eutectic mixtures containing significant amounts of LiOH may beneficially be used since LiOH contracts only 3.4 percent upon melting and thus tends to greatly reduce the total volume change in mixtures containing LiOH.

Integration of the thermal storage heat exchanger 10 into a generation system can readily be performed in a variety of ways. FIG. 2 shows a direct Rankine type cycle wherein the working fluid, such as water, is also used to drive the turbine 52 and associated electrical generator 58. The water can be superheated and pass from the heat source 56, such as a solar receiver, through the turbine 52 and condenser 60, and returned by feedwater pump 62 to the heat source 56, in its most direct mode of operation. When it is desired to utilize the heat exchanger 10 to store or discharge thermal energy, alternate flow paths are available. Throughout FIGS. 2 and 5 to 9, the solid arrowheads represent available flow paths during storage of thermal energy in the heat exchanger 10 and the open arrowheads represent available flow paths during discharge of thermal energy from the heat exchanger 10.

Either storage or discharge of energy can be a singular operation, or combined with energy supply from the heat source 56 to the turbine 52. During storage all or a portion of the working fluid from heat source 56 (FIG. 2) passes through conduit 62, to the heat exchanger 10, and through conduit 64 and valve 66 to liquid storage tank 44 or through conduit 68 and pump 70 back to the heat source.

During discharge the working fluid passes from either the liquid storage tank 44 through conduit 72, pump 74, and valve 76 to conduit 64 and into the heat exchanger 10, or from feedwater pump 62 through valve 78 to conduit 64 and into the heat exchanger 10.

When the heat source 56 can supply sufficient energy to both the turbine 52 and storage 10, the temperature of the working fluid exiting the heat source can be controlled primarily by varying the flow rate through the pump 70. The pressure in the vapor side piping of the heat source, conduit 80, can be controlled by adjusting the liquid level in the heat exchanger 10. When the pressure level is above an upper preselected value, the liquid level in the heat exchanger is reduced. Conversely, when the pressure level is below a preselected lower value, the liquid level in the heat exchanger is increased. This will produce essentially constant temperature and pressure conditions at the turbine inlet throttle valve 54.

When the heat source 56 could no longer supply "excess" energy for storage, the pump 70 would be shutdown and the feedwater flow from pump 62 would be split with a controlled amount going to the heat source inlet through valve 82 and conduit 84 based upon the thermal conditions, such as temperature, of the vapor exiting the heat source 56; the balance of the feedwater flow would then go into the heat exchanger loop through valve 78. The pressure level in the conduit 80 can here also be controlled by varying the liquid level in the heat exchanger 10.

Figure 3:
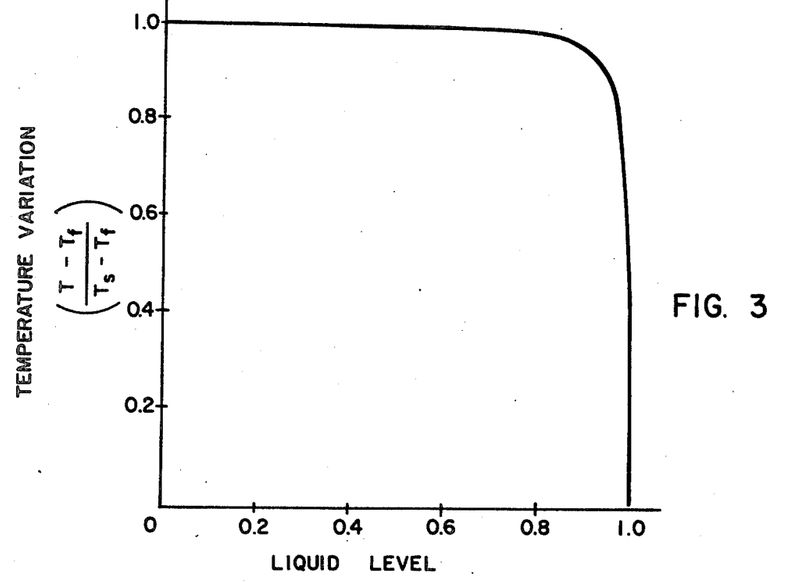
FIG. 3 is a graphical representation showing the variation in exit fluid temperature with changes in liquid level in a storage heat exchanger.

When the heat source, such as a solar reflector, is shutdown and valved out of the system, such as during the dark of night, vapor pressure in conduit 80 can continue to be controlled by varying the liquid level in the storage heat exchanger, the heat exchanger providing sufficient steam flow to drive the turbine 52. However, over a continued period of time there would be a gradual reduction in vapor temperature at the turbine valve 54 in this mode of operation. This variation in temperature is shown by FIG. 3 in which the the abscissa represents the level of liquid within the heat exchanger, expressed as a fraction, and the ordinate represents the temperature variation at the heat exchanger outlet, expressed as the fraction $T-T_F/(T_S-T_F)$ where T is the exit temperature, $T_S$ is the initial bed matrix temperature, and $T_F$ is the feed liquid temperature.

An advantageous safety feature of this thermal storage and generation system is its response to a sudden turbine trip or loss of load. If a sudden unplanned turbine shutdown occurred, the heat exchanger system could absorb all of the power generated by the heat source with proper redundancy, sizing, and control of the pump 70. A fast action shutdown of the heat source would therefore not be required, nor would a separate dummy load for dumping of steam.

Figure 4:
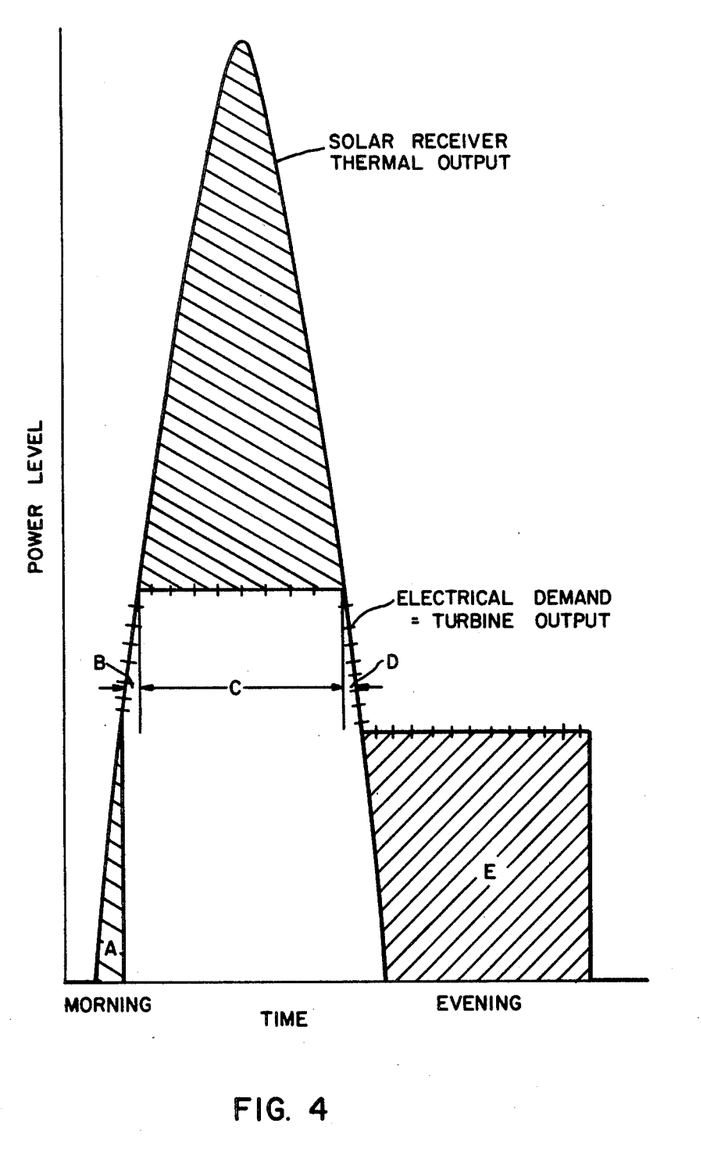
FIG. 4 is a graphical representation of thermal power level and distribution from the system of FIG. 2.

FIG. 4 shows the typical thermal power level (ordinate) and distribution over the time period of one day (abscissa) for a generation and storage system utilizing a solar heat source. It assumes a simplified varying electrical demand on the system increasing to an upper static level during the "working" day, decreasing to a lower static level toward "evening", and a negligible demand during the "early morning" hours. During the time period "A" the solar receiver thermal output would be directed solely to storage; during periods "B" and "D" the output is directed solely to the turbine; during "C" the output is directed to both storage and the turbine; and, during period "E" the turbine is driven solely by power from storage.

FIGS. 5 through 9 schematically illustrate alternate generation systems advantageously utilizing the disclosed thermal storage heat exchanger 10. The system of FIG. 5 uses a separate, or isolated, turbine generator circulation loop. The thermal storage loop can here utilize a separate fluid from the turbine loop, and the loops can operate at significantly different pressures. The storage loop could circulate an organic fluid and operate at about atmospheric pressure, significantly decreasing the cost of many components within the loop. This configuration requires an additional heat exchanger 86, such as a shell and tube steam generator, to transfer thermal energy between the loops. The heat exchanger 86 lessens total system efficiency when the turbine is driven from either the heat source 56 or the storage heat exchanger 10.

Figure 5:
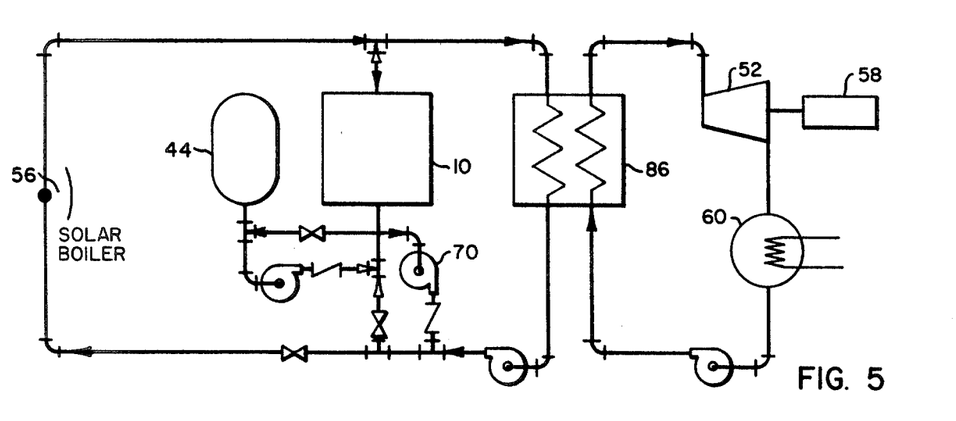
FIGS. 5 through 9 are flow schematics, similar to FIG. 2, of alternate energy generation systems incorporating a storage heat exchanger consistent with this invention.
Figure 6:
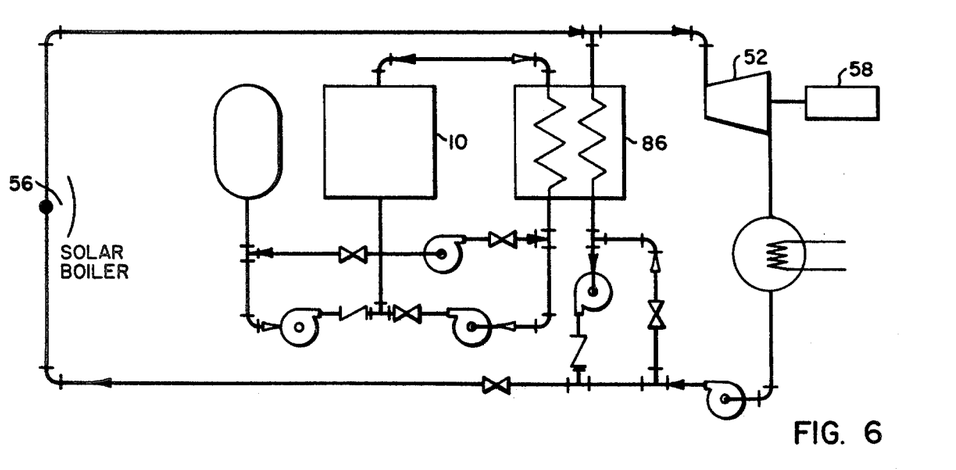

FIG. 6 shows a system very similar to that of FIG. 5. The storage heat exchanger loop here, however is isolated from the turbine 52 loop and also from the heat source 56. With this configuration the system efficiency is not affected in the mode where the turbine is driven directly from the heat source 56. The efficiency is only lessened when the turbine is powered with energy from the storage loop. The isolated heat storage loop can advantageously circulate an organic fluid.

Figure 7:
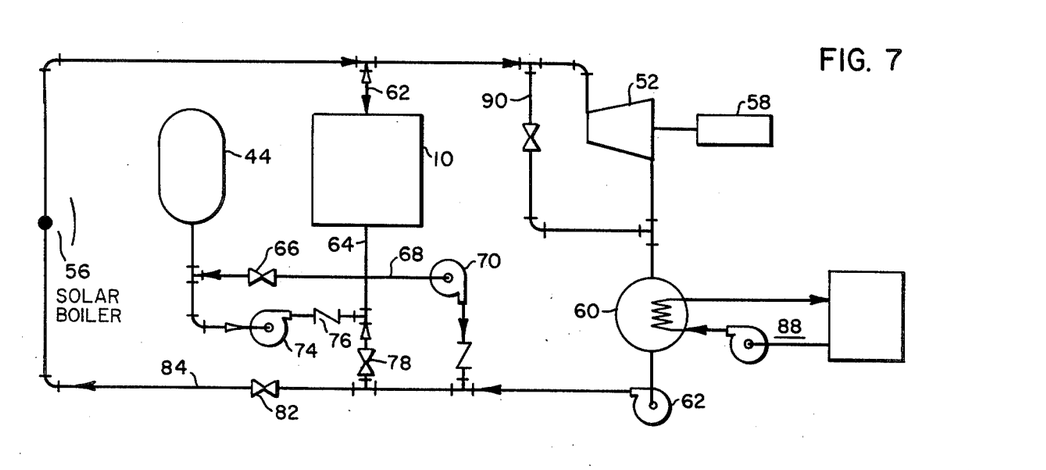

Depending upon the temperature drop through the turbine 52, the turbine discharge can be utilized in a separate thermal energy utilization system 88 in heat exchange relation with the condenser 60, as shown in FIG. 7. This arrangement can include a turbine bypass through conduit 90 directly to the condenser.

Figure 8:
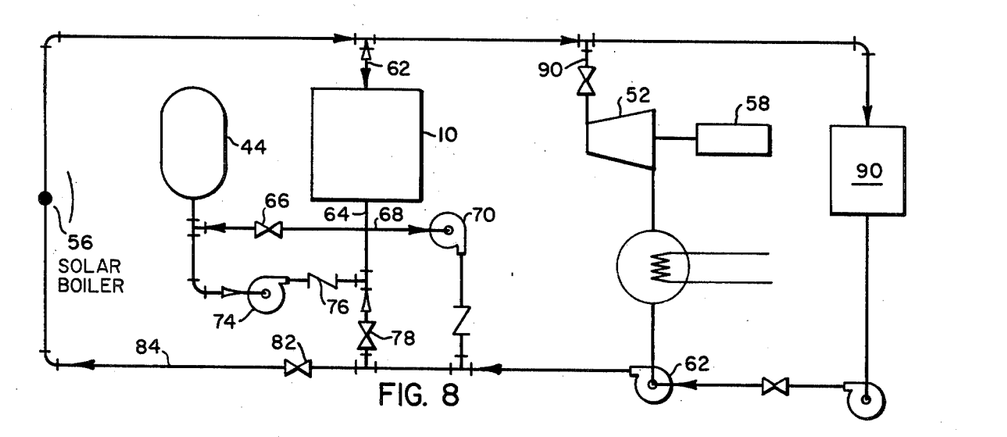

Similarly, FIG. 8 shows another separate energy utilization system 90 driven directly by source vapor without passage through the condenser.

Figure 9:
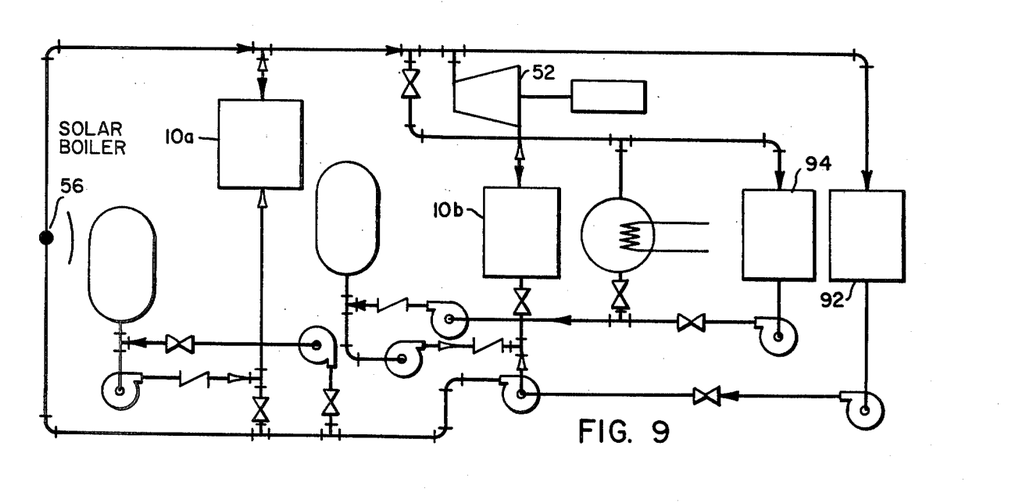

FIG. 9 shows a more complex arrangement using both high temperature 92 and low temperature 94 thermal utilization systems in addition to electrical generation from the turbine 52. It also utilizes two thermal storage heat exchangers, one for high temperature storage 10a and one for low temperature storage 10b.

There has therefore been described a direct contact thermal storage heat exchanger, useful in energy generation systems, which utilizes a liquid-vapor phase change of a working fluid and which can also utilize a solid-liquid phase change of a heat storage medium having a relatively high heat capacity. The round-trip heat storage efficiency of this invention can be extremely high. Further, by using eighty to ninety percent of the effective pebble bed height within the heat exchanger, the efficiency of a coupled electrical turbine can be only negligibly affected (FIG. 3). In this type of heat storage electrical generation system, the pumping energy required for liquid level control is about one percent of the stored energy; the heat losses from the heat exchanger and liquid storage tank can be as low as one to two percent of the stored energy when both units are properly insulated; the degradation of stored energy due to axial conduction through the pebble bed is approximately one percent, and, the energy requirement to provide pressurization in the storage tank is about one percent. Therefore, the described heat exchanger has the potential of providing in the range of ninety to ninety-five percent round trip heat efficiency. Further, the reliability of the components and the system can be made high, as the heat exchanger and storage tank are static components, and the required pumps and valves operate essentially at feedwater conditions and have relatively low pressure differentials across them.

It will be apparent that many modifications and additions are possible in view of the above teachings. It therefore is to be understood that within the scope of the appended claims, the invention may be practiced other than as specifically described.

I claim:

1. A direct contact storage heat exchanger system comprising:

a. a conduit for conducting a working fluid in a vapor phase from a solar boiler to a prime mover;
   b. a pressure vessel having lower means for passing said working fluid solely in the liquid phase into and out of said vessel and upper means for passing said working fluid in the vapor phase from and to said conduit into and out of said vessel said lower means including a storage tank, piping connecting the bottom of said pressure vessel and said storage tank, and structure for selectively transporting said fluid in a liquid phase between said storage tank and pressure vessel;
c. means for thermally insulating said vessel;
d. a plurality of pebbles packed within and substantially filling said vessel, said pebbles comprised of a material having a relatively high capacity for storing heat energy; and
e. means for maintaining a liquid level of said working fluid within said vessel and for adjusting said liquid level so as to selectively effect a liquid-vapor phase change of said working fluid within said vessel and to receive and discharge vapor from said vessel in a manner so as to maintain a substantially constant pressure in said conduit.

2. A direct contact storage heat exchanger system comprising:
a. a conduit for conducting a working fluid in a vapor phase from a solar boiler to a prime mover;
b. a pressure vessel;
c. means for insulating said vessel;
d. a plurality of pebbles comprised of a material having a relatively high heat capacity packed within and substantially filling said vessel;
e. upper means for selectively passing a working fluid between said conduit and vessel in a vapor phase;
f. lower means for selectively passing said working fluid into and out of said vessel solely in a liquid phase, said lower means including a storage tank, piping connecting the bottom of said pressure vessel and said storage tank, and structure for selectively transporting said fluid in a liquid phase between said storage tank and pressure vessel; and
g. means for maintaining a substantially constant pressure of said working fluid in a vapor phase in said conduit including structure for maintaining a liquid level of said working fluid within said vessel and for adjusting said liquid level such that energy is added to said pebbles upon transfer of said working fluid in a vapor phase from said conduit to said vessel by lowering said liquid level so that said working fluid is converted to a liquid phase, and energy is transferred from said pebbles to said working fluid by raising said liquid level thereby converting said working fluid in a liquid phase to a vapor phase, and transferring said fluid in a vapor phase to said conduit.

3. The heat exchanger system of claim 2 wherein said pebbles include a sealed shell surrounding said material, and said material is selected from the group consisting of those materials listed in Table I.

4. A direct contact storage heat exchanger system comprising:
a. a conduit for conducting a working fluid in a vapor phase from a solar boiler to a prime mover;
b. a pressure vessel;
c. means for thermally insulating said vessel;
d. a bed comprised of a plurality of pebbles disposed within and substantially filling said vessel, each said pebble including a sealed shell surrounding a heat of fusion material; and
e. means for selectively passing said working fluid into and out of said vessel, including a storage tank and piping connecting the bottom of said pressure vessel and storage tank, so as to maintain a substantially constant pressure of working fluid in a vapor phase in said conduit, and for maintaining and adjusting a liquid level of said working fluid in said bed so that
  i. upon lowering said liquid level said working fluid enters said bed in a vapor phase from said conduit and undergoes a vapor to a liquid change of phase, and said heat of fusion material within some of said pebbles undergoes a solid to liquid change of phase, and
  ii. upon raising said liquid level said working fluid undergoes a liquid to vapor change of phase and exits from said bed to said conduit, and said heat of fusion material undergoes a liquid to solid change of phase.

5. A method of operating a direct contact storage heat exchanger system so as to maintain a substantially constant pressure of working fluid in a vapor phase in a conduit of said system interconnecting a solar boiler and a prime mover, said system including a plurality of pebbles packed within and substantially filling a pressure vessel, said system further having lower means for passing a working fluid into and out of said vessel solely in a liquid phase including a storage tank and piping connecting the bottom of said pressure vessel and said storage tank, and upper means for passing a working fluid into and out of said vessel in a vapor phase, said method comprising the selective steps of:
a. lowering the liquid level of said working fluid within said vessel upon flow of said working fluid in a vapor phase entering said vessel from said conduit by outletting said liquid from said vessel to said storage tank such that the uppermost pebbles are exposed to said vapor and heat energy is transferred to said pebbles in an amount sufficient to raise the temperature of said pebbles above the saturation temperature of said fluid thereby lowering the pressure of said working fluid in said conduit; and
b. raising the liquid level of said working fluid within said vessel by inletting said liquid from said storage tank whereby liquid in said vessel is exposed to said pebbles at said temperature above saturation, thereby vaporizing said working fluid so as to allow said fluid to be discharged in a vapor phase from said vessel to said conduit thereby raising the pressure of said working fluid in said conduit.

6. An energy storage and utilization system comprising:
a. a solar boiler for vaporizing a working fluid;
b. a prime mover;
c. a conduit for conducting said working fluid in a vapor phase from said solar boiler to said prime mover;
d. means for maintaining a substantially constant pressure of working fluid in a vapor phase in said conduit including a direct contact thermal storage heat exchanger in fluid communication with said solar boiler and prime mover through said conduit comprising:
  i. a pressure vessel;
  ii. means for insulating said vessel;
  iii. a plurality of pebbles comprised of a material having a relatively high heat capacity packed within said substantially filling said vessel;
  iv. an upper channel for selectively passing said working fluid in a vapor phase from said conduit into said vessel and from said vessel to said conduit;

v. a lower channel for selectively passing said working fluid into and out of said vessel in a liquid phase; and vi. means for maintaining and adjusting a liquid level of said working fluid within said vessel such that energy is added to said pebbles, to lower the pressure of said working fluid in said conduit, upon entrance of said working fluid in a vapor phase from said conduit into said vessel by lowering said liquid level such that said working fluid is converted to a liquid phase, and such that energy is transferred from said pebbles to said working fluid, to raise the pressure of said working fluid in said conduit, by raising said liquid level thereby converting said working fluid in a liquid phase to a vapor phase and discharging said fluid in a vapor phase to said conduit;

e. means for directing said working fluid solely in a vapor phase between said vessel and conduit;

f. means for directing said working fluid solely in a liquid phase to and from said lower channel including a storage tank in fluid communication with said lower channel; and g. means for selectively circulating said working fluid from said solar boiler to one of said heat exchanger and prime mover and from one of said prime mover and heat exchanger back to said solar boiler.

* * * * *